United States Patent
Choi et al.

(10) Patent No.: US 10,152,895 B2
(45) Date of Patent: Dec. 11, 2018

(54) FLIGHT GUIDANCE METHOD OF HIGH ALTITUDE UNMANNED AERIAL VEHICLE FOR STATION KEEPING

(71) Applicant: Korea Aerospace Research Institute, Daejeon (KR)

(72) Inventors: Hyoung Sik Choi, Daejeon (KR); Sung Yug Kim, Daejeon (KR); Hyeok Ryu, Daejeon (KR); Seok Min Ahn, Daejeon (KR)

(73) Assignee: Korea Aerospace Research Institute, Daejeon (KR)

( * ) Notice: Subject to any disclaimer, the term of this patent is extended or adjusted under 35 U.S.C. 154(b) by 72 days.

(21) Appl. No.: 15/230,441

(22) Filed: Aug. 7, 2016

(65) Prior Publication Data
US 2017/0039862 A1 Feb. 9, 2017

(30) Foreign Application Priority Data
Aug. 7, 2015 (KR) .................. 10-2015-0111477

(51) Int. Cl.
*G05D 1/04* (2006.01)
*G08G 5/00* (2006.01)
(Continued)

(52) U.S. Cl.
CPC ......... *G08G 5/0069* (2013.01); *G05D 1/0005* (2013.01); *G05D 1/046* (2013.01);
(Continued)

(58) Field of Classification Search
CPC ...... G05D 1/005; G05D 1/046; G05D 1/0204; G05D 1/101; G08G 5/0034; G08G 5/0052; G08G 5/0069; B64C 39/024
See application file for complete search history.

(56) References Cited

U.S. PATENT DOCUMENTS

2007/0252035 A1* 11/2007 Hubbard, Jr. ........... B64C 13/16
244/75.1
2014/0018979 A1* 1/2014 Goossen .............. G08G 5/0034
701/3
(Continued)

FOREIGN PATENT DOCUMENTS

JP       2010-173401    8/2010
JP       2013-169972    9/2013
KR    10-2015-0066223    6/2015

OTHER PUBLICATIONS

Notice of Grounds of Reasons for Rejection dated Mar. 19, 2016 From the Korean Intellectual Property Office Re. Application No. 10-2015-0111477.
(Continued)

*Primary Examiner* — Dale Moyer (57) ABSTRACT

Disclosed is an automatic climbing and gliding method of a high altitude unmanned aerial vehicle (UAV). The disclosed method includes setting a cylindrical virtual flight region so that the high altitude UAV climbs and glides, setting a first target point on an end of a first flight radius which is vertically arranged to form the virtual flight region, setting second to Nth target points at arbitrary second to Nth flight radii sequentially arranged above or below the first flight radius, having the target points have a predetermined plane slope angle, and allowing the UAV to climb along a straight path line sequentially connecting each of the target points.

4 Claims, 7 Drawing Sheets

(51) Int. Cl.
  *G05D 1/00*   (2006.01)
  *G05D 1/02*   (2006.01)
  *G05D 1/10*   (2006.01)

(52) U.S. Cl.
  CPC ......... *G08G 5/0034* (2013.01); *G08G 5/0052* (2013.01); *G05D 1/0204* (2013.01); *G05D 1/101* (2013.01)

(56) References Cited

U.S. PATENT DOCUMENTS

| | | | |
|---|---|---|---|
| 2014/0129056 A1* | 5/2014 | Criado | G05D 1/105 701/4 |
| 2014/0192193 A1* | 7/2014 | Zufferey | G05D 1/0094 348/144 |
| 2015/0226575 A1* | 8/2015 | Rambo | B64C 39/024 701/523 |
| 2015/0254988 A1* | 9/2015 | Wang | G05D 1/0214 701/3 |
| 2017/0301242 A1* | 10/2017 | Yu | G05D 1/0214 |
| 2017/0372618 A1* | 12/2017 | Xu | G08G 5/006 |

OTHER PUBLICATIONS

DJI "Ground Station Wireless Data-Link. User Manual", Dajiang Innovation Technology, Version 2.4, p. 1-46, Nov. 2014.
Translation of Notification of Reason for Refusal dated Mar. 19, 2016 From the Korean Intellectual Property Office Re. Application No. 10-2015-0111477.

* cited by examiner

FIG. 3B $(0<\theta<90°)$

FIG. 7C

FLIGHT GUIDANCE METHOD OF HIGH ALTITUDE UNMANNED AERIAL VEHICLE FOR STATION KEEPING

RELATED APPLICATION

This application claims the benefit of priority of Korean Patent Application No. 10-2015-0111477 filed Aug. 7, 2015, the contents of which are incorporated herein by reference in their entirety.

FIELD AND BACKGROUND OF THE INVENTION

The present invention relates to a flight guidance method of a high altitude unmanned aerial vehicle (UAV) for station keeping, and more particularly, to a flight guidance method of a high altitude UAV for station keeping in which a straight flight that connects points on the circle is used instead of a circle turning flight (loitering) so that fatigue of a remote pilot is reduced and the UAV is not lost due to a jet stream, etc. when the high altitude UAV automatically flies toward a destination of the stratosphere.

An unmanned aerial vehicle (UAV) is remotely controlled by ground control equipment, which is controlled by a remote pilot. Basically, the remote pilot controls altitude, velocity, and an azimuth of the UAV by manipulating dials (knobs). As a more automated method, the velocity and the altitude are controlled by the same method and the azimuth is controlled using a guidance method in which coordinates of a target destination are input by touch panel and the UAV is enabled to fly automatically to the destination. "Waypoint navigation" is representative of such a guidance method. A target point, which is coordinates of a target destination, is a specific point disposed on a plane irrespective of altitude.

Since the azimuth is frequently manipulated compared with the manipulation of the velocity and the altitude, waypoint navigation is a method that reduces fatigue of a remote pilot by automating the manipulation of the azimuth.

An automatic azimuth control method of waypoint navigation has two functions, one is a "destination guidance" function, also named LOS (line of sight), which fixes a target point and flies to the target point and the other is a "turning flight (loitering)" function, also named LOT (Loitering), which flies along a constant circle for station keeping when the target point is reached. Turning flight (LOT) is generally implemented in a circle shape. The automatic azimuth control method is a method in which, when a user moves the target point to a different point during turning flight, the UAV repeats turning flight after moving toward and reaching the different point.

Meanwhile, in the case of a high altitude UAV, because a wing span is large to enhance lift efficiency, a flight velocity is very slow at about 25 km/h and a rate of climb also very low at about 2 km/h. Because the UAV climbs very slowly, it takes a long time, such as about 6 hours, to reach a high altitude, such as the stratosphere of 12 km or more.

Further, in order to reach the stratosphere, the UAV passes through a section of a jet stream of 50~100 km/h, and after reaching the stratosphere, and it is necessary to perform station keeping to maintain altitude and perform a work of long term endurance.

A flying object having a very low speed as described above may be wrecked due to fatigue failure of the flying object by being stressed when an appropriate corresponding action is absent to wind, may be blown by the wind and lost.

Further, since the UAV should fly within an approved flight area, the UAV having a low rate of climb reaches the boundary of the flight area in a state in which the UAV climbs a little altitude though climbing in straight flight, and here, the UAV should be turned.

As described above, the remote pilot becomes very tired due to 6 hours or more of individual manipulation corresponding to the flight area and the wind until the UAV reaches the target altitude.

Meanwhile, there is waypoint navigation, which is conventionally used as a method in which the UAV automatically climbs, flies and keeps station. However, waypoint navigation has a disadvantage. When using "destination guidance(LOS)" method in that case the pilot must input too many points considering with various wind condition. When using turning flight (LOT) method for station keeping, in that in the case of being turning flight (LOT) after reaching a target point, the target point is vague, and therefore the UAV may drift when wind is strong. That is, because a turning flight (LOT) method for station keeping, is implemented to follow the trajectory of a circle and is a method which decreases a distance between the location of the UAV and a normal line of the trajectory of the circle, so the target point does not exist on the trajectory of the circle. Therefore, when wind having a faster speed than the UAV blows, the UAV veers from the trajectory as a result of being pushed and drifts due to not having a particular target point.

Further, because the method described above needs constant turning flight, a control surface and an actuator are continuously loaded and there is a disadvantage in that energy consumption increases.

PRIOR ART DOCUMENT

Patent Document

Patent Document 1: Korea Patent Unexamined Publication No. 10-2015-0066223

SUMMARY OF THE INVENTION

The present invention is directed to provide a flight guidance method of a high altitude unmanned aerial vehicle (UAV) for station keeping so that the UAV securely climbs (or cruises, descends) in a determined flight area without losing a target point although wind is strong when the high altitude UAV automatically climbs to the stratosphere or automatically glides from the stratosphere to ground.

For climb example, Embodiments of the present invention includes flight guidance method of a high altitude unmanned aerial vehicle (UAV) for station keeping, the method including setting a cylindrical virtual flight region so that the high altitude UAV climbs and glides, setting a first target point on an cross point of a flight direction with designated flight radius which is vertically arranged to form the virtual flight region, setting second to Nth target points at designed (w.r.t this invention) second to Nth flight radii sequentially arranged above or below the first flight radius, and allowing the UAV to climb along straight path lines sequentially connecting each of the target points.

The path lines may have a predetermined plane slope angle θ therebetween, and the plane slope angle θ may be 0°≤θ≤90°. That is, the plane slope angle can be determined based on the number of points on the circle.

A connecting shape of the path lines may be any one of a line, a polygon or a star shape as seen in a plane view, but the connecting shape is not limited thereto.

When the UAV climbs and a flight direction of the UAV is turned to a direction facing a wind due to a lateral direction wind, the target point may be modified in a the turned flight direction.

In the present invention, when a high altitude unmanned aerial vehicle (UAV) automatically climbs to the stratosphere or glides from the stratosphere to ground or cruise at stratosphere given area, the UAV climbs and glides in a state of having a longest straight flight by setting a target point in a determined flight area so that fatigue of a remote pilot can be reduced.

Further, when blown backward by a strong wind, because the UAV has a target point set for itself, the loss of the UAV can be prevented by preventing drift.

Further, because the UAV climbs and glides in a state of having a longest straight flight, a flying distance can be effectively reduced and therefore energy consumption can be decreased.

DESCRIPTION OF SPECIFIC EMBODIMENTS OF THE INVENTION

The terminology used herein is for the purpose of describing particular embodiments only and is not intended to be limiting of the present invention. As used herein, the singular forms "a," "an," and "the," are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, embodiments of the present invention will be described with reference to the accompanying drawings.

Figure 1:
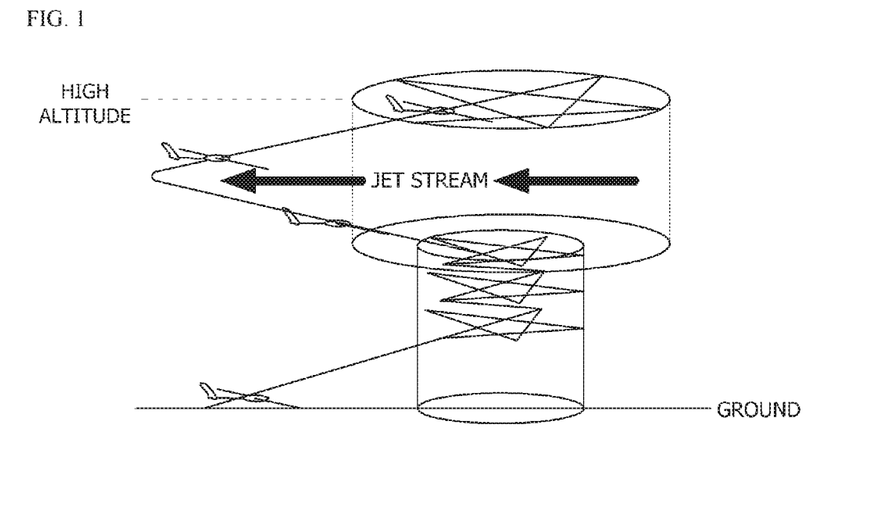
FIG. 1 is a flight trajectory diagram of climbing and gliding of a high altitude unmanned aerial vehicle (UAV) according to the present invention.

FIG. 1 is a flight trajectory diagram of climbing and gliding of a high altitude unmanned aerial vehicle (hereinafter, abbreviated as "UAV") according to the present invention.

Referring to FIG. 1, a flight region (a flight radius) of a high altitude UAV 10 according to the present invention is defined as a center and a radius, and the region is in a circular shape.

The UAV 10 gradually climbs and glides or cruise while flying straight along a predetermined numbers of target points in the flight region. Likewise, when the UAV 10 flies straight in the flight region, a climbing speed and gliding speed are increased compared to a conventional turning flight, and thereby fatigue of a control surface may be decreased and energy consumption may be decreased.

Further, when the UAV 10 flies straight in the flight region, even in the case of being pushed by a strong wind, such as a jet stream, because the UAV 10 has a target point, the UAV 10 may climb or glide while heading to the target point without drifting. As described in the above method, when the UAV 10 passes through the jet stream and the intensity of the wind decreases, the UAV 10 may reach the target point again.

Figure 2:
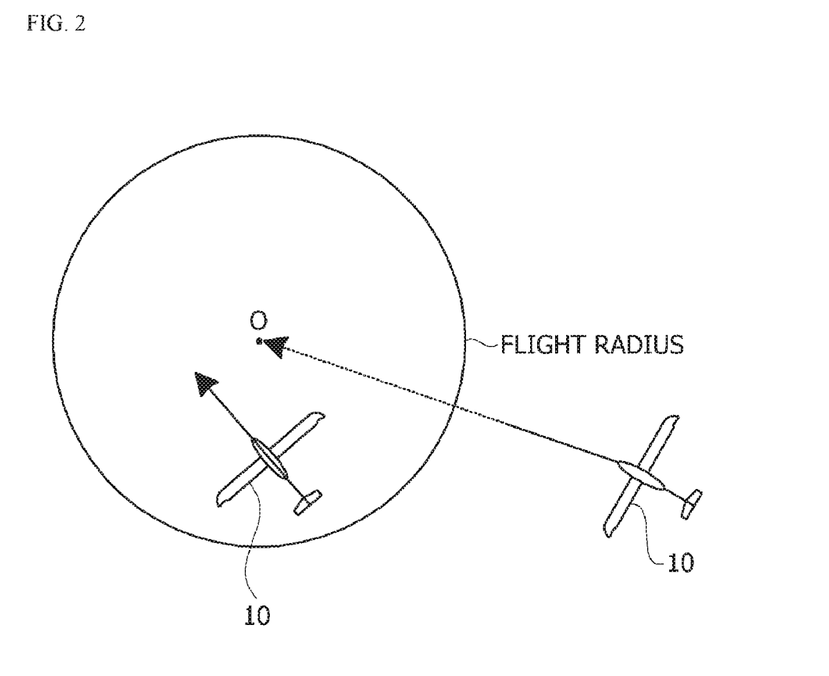
FIG. 2 is a diagram illustrating a flight direction when a high altitude UAV according to the present invention is positioned inside and outside a flight radius.

FIG. 2 is a diagram illustrating a flight direction when a high altitude UAV according to the present invention is positioned inside and outside a flight radius.

Referring to FIG. 2, in a state in which an operational mode of the UAV 10 is set and the UAV 10 is positioned inside the flight radius, the UAV 10 flies toward a target point on the end center of the flight radius while maintaining a current flight direction, and when the UAV 10 is positioned outside the flight radius, the UAV 10 is led toward a center O of the flight radius, and as a result is positioned inside the flight radius.

As described above, even when the UAV 10 is positioned inside or outside the flight radius, because the UAV 10 is set to induce flying straight toward the target point on the end of flight radius or the center O thereof, the flight path may be shortened compared to a conventional turning flight.

FIGS. 3A, 3B, 4 and 5 illustrate types of straight flights of a high altitude UAV according to the present invention inside a flight radius.

Figure 3A:
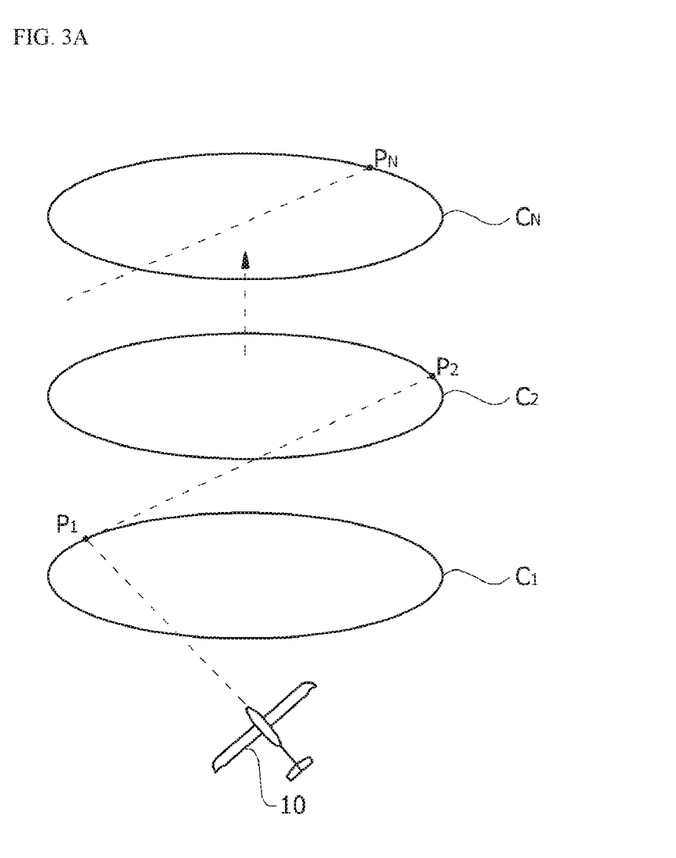
FIG. 3A is a perspective diagram illustrating a first type diagram of a straight flight of a high altitude UAV according to the present invention.
Figure 3B:
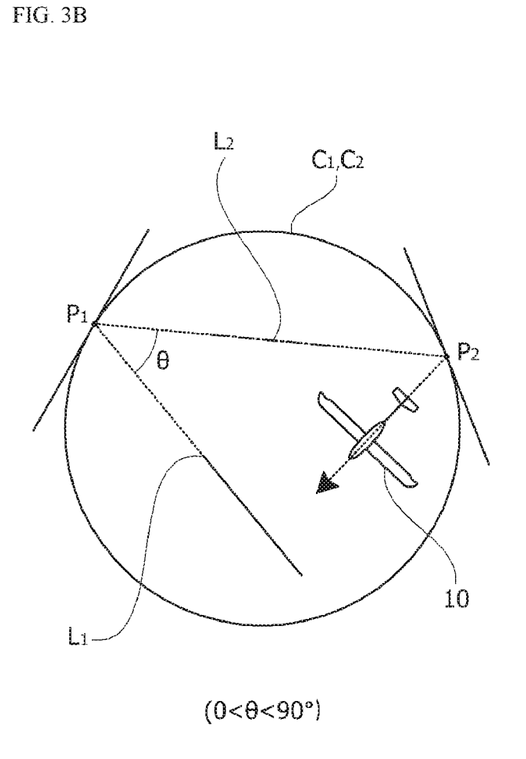
FIG. 3B is a plan diagram of FIG. 3A.

First, FIG. 3A is a perspective diagram illustrating a first type diagram of a straight flight of a high altitude UAV according to the present invention, and FIG. 3B is a plan diagram of FIG. 3A.

As illustrated in FIG. 3A, in the present invention, a first target point $P_1$ is set on the end of a virtual first flight radius $C_1$ and second to N target points $P_22$ to $P_n$ are designed cross point (intended turning back angle line with flight radii) on the ends of second to N flight radii $C_22$ to $C_n$ which are sequentially disposed above or below the first flight radius $C_1$ and are then vertically arranged to form a cylindrical flight region, and target points have a certain planar reflection angle θ between sequential target points, thereby allowing the UAV 10 to climb or glide according to a straight flight path sequentially connecting the target points.

Referring to FIG. 3B, when the UAV 10 continuously flies straight within the first flight radius $C_1$ and reaches an opposite point of the end of the second flight radius $C_2$, the UAV 10 is turned in a direction that is a reflected direction which is perpendicular to or an acute angle with a tangent line at the reached point, and flies straight. When the UAV 10 reaches the end of another flight radius again, the UAV 10 is turned in the same manner as described above. Therefore, the UAV 10 remains within the flight radius and flies straight in the form of zigzag.

Here, an angle θ between a virtual incident line $L_1$ heading to the first target point $P_1$ of the target points and a reflected line $L_2$ heading from the first target point $P_1$ to the second target point $P_2$ being $0°≤θ≤90°$ is preferable.

When the angle θ between the incident line $L_1$ and the reflected line $L_2$ is greater than 90°, because the flight trajectory of the UAV 10 is close to a circle, fatigue may be accumulated on a control surface and an actuator as in the above described conventional problem, and a problem in that energy consumption is increased occurs. Therefore, a reflected angle should preferably be limited so that the sum of an incident angle and a reflected angle is smaller than 90°.

Figure 4:
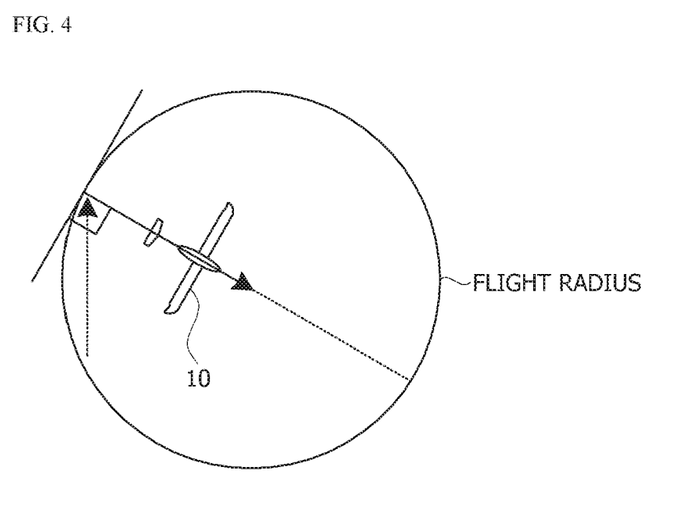
FIG. 4 is a second type diagram of a straight flight of a high altitude UAV according to the present invention.

FIG. 4 illustrates a method of modifying a path to be perpendicular (at a right angles) to a tangent line when the UAV 10 reaches a tangent section of the circumference of the flight radius which is a planar flight region. In this case, the UAV 10 reciprocates along a diameter line inside the flight radius.

Figure 5:
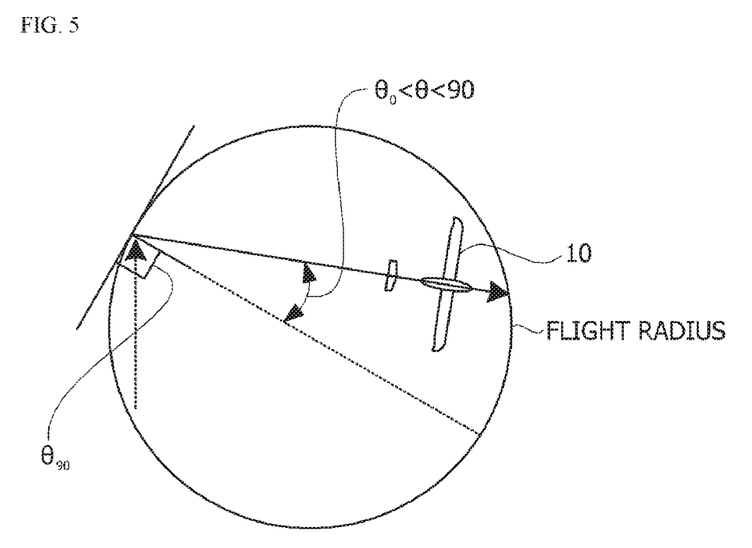
FIG. 5 is a third type diagram of a straight flight of a high altitude UAV according to the present invention.

FIG. 5 illustrates a method of modifying a path by adding a predetermined acute angle ($θ_{0<θ<90}$) to an angle ($θ_{90}$) perpendicular with the tangent line when the UAV 10 reaches the tangent section of the end of the flight radius.

FIGS. 6A, 6B, 6C and 6D illustrate various types of flight paths when a flight radius is viewed from the top.

Figure 6A:
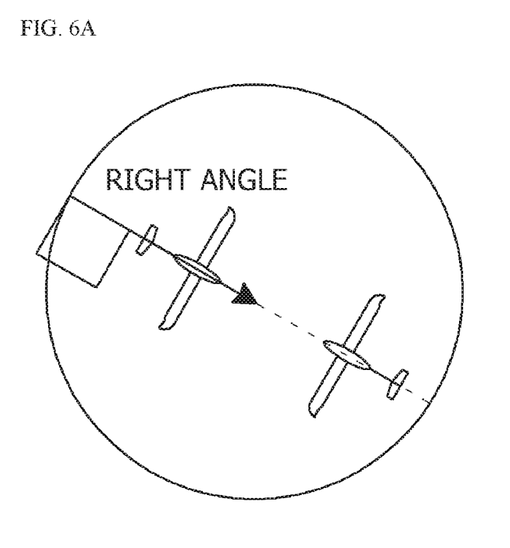
FIGS. 6A, 6B, 6C and 6D are diagrams illustrating various types of flight paths when a flight radius is viewed from the top.
Figure 6B:
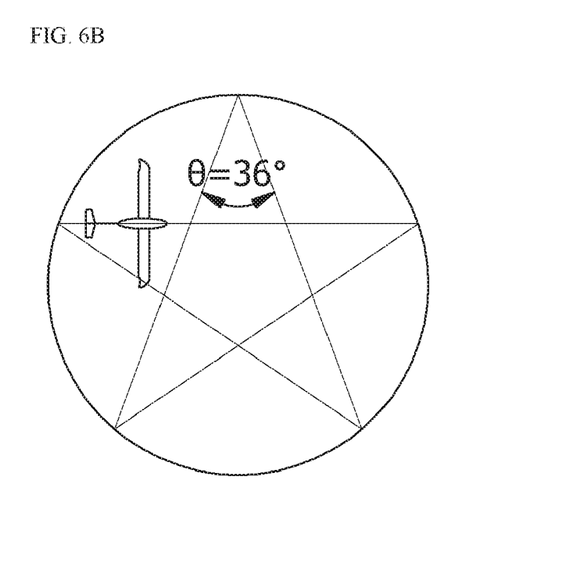
Figure 6C:
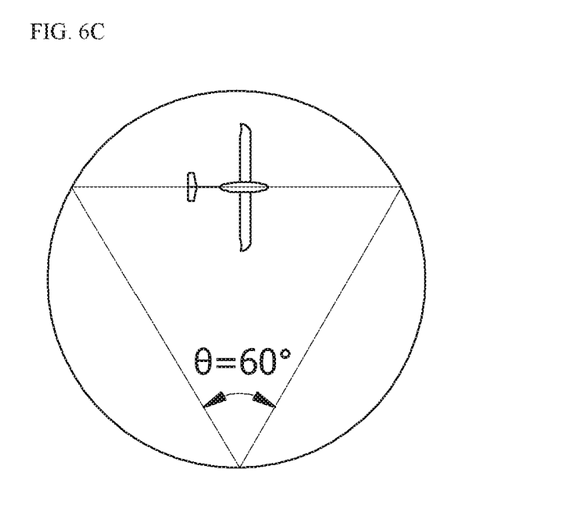
Figure 6D:
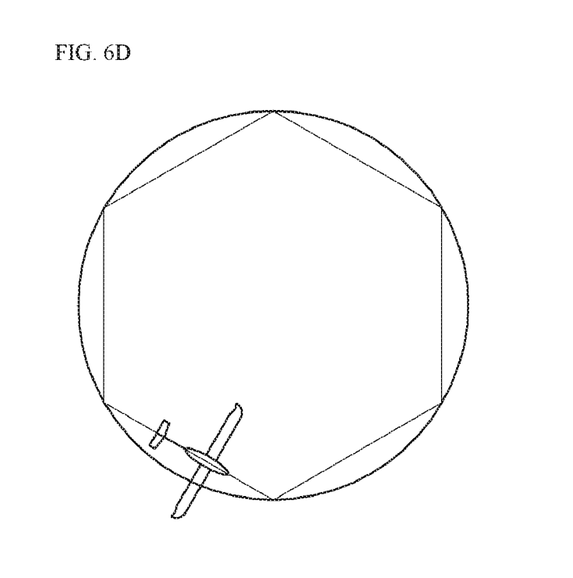

FIG. 6A is a case in which the UAV 10 flies back and forth to alternate two target points when the two target points are designated. FIG. 6B is a case in which the UAV 10 flies across the trajectory thereof in the form of a star shape when five target points are designated. FIGS. 6C and 6D is a case in which the UAV 10 flies along a line trajectory connecting target points when four or more target points are designated.

These cases implement various types of flight cases according to the number of target points and changes in positions of the target points.

Figure 7A:
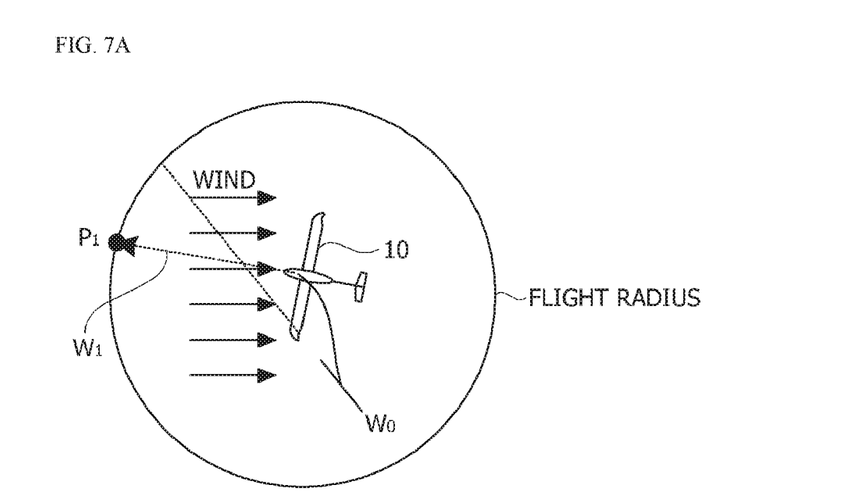
FIGS. 7A, 7B and 7C are path correction diagrams when a high altitude UAV according to the present invention is affected by wind.
Figure 7B:
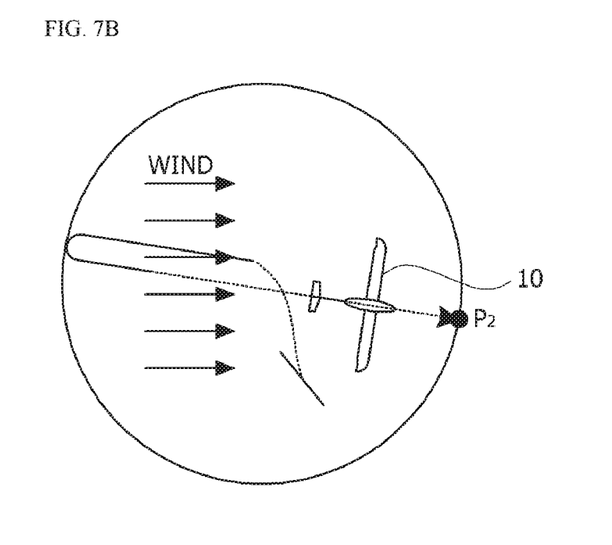
Figure 7C:
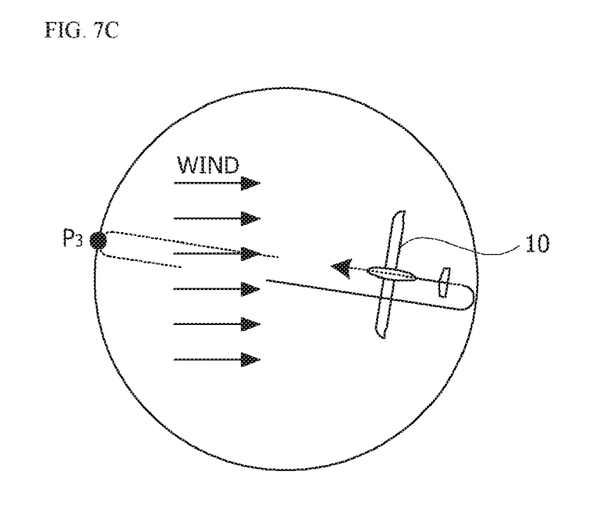

As the method described above is a basic operation mode which does not consider a variable of wind, when the intensity of wind increases, it is necessary to modify the path with respect to the wind by modifying the path to the nose of the UAV 10. A detailed description regarding this will be as follows. FIGS. 7A, 7B and 7C are schematic diagrams illustrating a method for modification of a path with respect to wind.

As illustrated in FIG. 7A, when the intensity of wind increases, the UAV 10 veers away from an existing path $W_0$ and a nose of the UAV 10 is naturally turned in a direction of the wind due to an effect of a vertical stabilizer.

When the wind is greater than a predetermined speed (for example, 50% or more of a cruise velocity), a path angle error is greater than a predetermined angle (for example, an azimuth error angle of 45° or more), or a path error distance is greater than a predetermined distance (for example, 10 times a wing width), the target point $P_1$ is changed to a current direction $W_1$ of the nose of the UAV 10.

When the UAV 10 reaches a changed target point $P_1$, a target point $P_2$ which is 180° behind the UAV 10 is reset unlike a case in which the wind is weak. Likewise, when the wind is strong, the UAV 10 flies alternately to target points $P_1$, $P_2$, and $P_3$ as illustrated in FIGS. 7A, 7B and 7C.

Meanwhile, although it is not illustrated in the drawings, a buffer region is additionally set outside the flight region. The buffer region is a region which is set to prevent the UAV 10 from mistakenly sensing that it has left the flight region even when it is positioned at the boundary area of the flight region.

The present invention has been described in detail with reference to the exemplary embodiments. However, the exemplary embodiments should be considered in a descriptive sense only, and the invention is not limited thereto. It should be apparent to those skilled in the art that various modifications and improvements within the scope of the invention may be made.

Simple modifications and alterations of the present invention fall within the scope of the present invention and the scope of the present invention is defined by the accompanying claims.

What is claimed is:

1. A flight guidance method of a high altitude unmanned aerial vehicle (UAV) for station keeping, the method comprising:
   setting a cylindrical virtual flight region so that the high altitude UAV climbs and glides;
   setting a first target at an arbitrary first flight radius from a plurality of flight radii vertically arranged to form the virtual flight region;
   setting second to $N^{th}$ target points at second to $N^{th}$ flight radii sequentially arranged above or below the first flight radius; and
   allowing the UAV to climb along straight path lines sequentially connecting each of the target points;
   wherein, when the UAV climbs and a flight direction of the UAV is turned to a direction facing a wind by a lateral direction wind, the target point is modified in the turned flight direction.

2. The method of claim 1; wherein the path lines have a predetermined plane slope angle θ therebetween.

3. The method of claim 2, wherein the plane slope angle θ is $0°≤θ≤90°$.

4. The method of claim 1, wherein a connecting shape of the path lines is a line, a polygon or a star shape as seen in a plane view.

* * * * *